(12) United States Patent
Ng et al.

(10) Patent No.: US 11,714,766 B2
(45) Date of Patent: Aug. 1, 2023

(54) ADDRESS TRANSLATION SERVICES BUFFER

(71) Applicant: ATI Technologies ULC, Markham (CA)

(72) Inventors: Philip Ng, Toronto (CA); Vinay Patel, Stouffville (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 17/136,618

(22) Filed: Dec. 29, 2020

(65) Prior Publication Data

US 2022/0206976 A1 Jun. 30, 2022

(51) Int. Cl.
*G06F 13/28* (2006.01)

(52) U.S. Cl.
CPC .......... *G06F 13/28* (2013.01); *G06F 2213/28* (2013.01)

(58) Field of Classification Search
CPC .............................. G06F 13/28; G06F 2213/28
See application file for complete search history.

(56) References Cited

U.S. PATENT DOCUMENTS

| | | | | |
|---|---|---|---|---|
| 2003/0188098 A1* | 10/2003 | Baxter, III | ............ | G06F 3/0689 711/114 |
| 2012/0144154 A1* | 6/2012 | Heller | ................... | G06F 9/4812 711/207 |
| 2012/0254582 A1* | 10/2012 | Raj | .......................... | G06F 13/28 711/206 |
| 2015/0058597 A1* | 2/2015 | King | .................... | G06F 12/1081 711/206 |
| 2017/0371816 A1* | 12/2017 | Klein | ................... | G06F 13/4027 |
| 2018/0011651 A1* | 1/2018 | Sankaran | ............... | G06F 3/0665 |
| 2018/0335956 A1* | 11/2018 | Iyer | ..................... | G06F 12/1081 |

* cited by examiner

*Primary Examiner* — Idriss N Alrobaye
*Assistant Examiner* — Ronald T Modo
(74) *Attorney, Agent, or Firm* — Park, Vaughan, Fleming & Dowler LLP

(57) ABSTRACT

An address translation buffer or ATB is provided for emulating or implementing the PCIe (Peripheral Component Interface Express) ATS (Address Translation Services) protocol within a PCIe-compliant device. The ATB operates in place of (or in addition to) an address translation cache (ATC), but is implemented in firmware or hardware without requiring the robust set of resources associated with a permanent hardware cache (e.g., circuitry for cache control and lookup). A component of the device (e.g., a DMA engine) requests translation of an untranslated address, via a host input/output memory management unit for example, and the response (including a translated address) is stored in the ATB for use for a single DMA operation (which may involve multiple transactions across the PCIe bus).

23 Claims, 4 Drawing Sheets

ADDRESS TRANSLATION SERVICES BUFFER

BACKGROUND

Electronic devices that operate within a PCIe (Peripheral Component Interface Express) fabric may implement the PCIe ATS (Address Translation Services) protocol to facilitate translations between untranslated (virtual) and translated (physical) addresses. These devices usually include a hardware ATC (Address Translation Cache) to cache translations for reuse.

However, a hardware cache requires dedicated memory and corresponding circuitry for controlling the cache, performing lookups, and/or supporting other operations. For example, when a cache (or a processor or controller for the cache) receives an invalidation request, the cache must be searched for matching entries and appropriate action must be taken. Implementing and supporting a hardware cache thus requires resources that could be used for other purposes. In addition, an ATC may be inefficient in some environments, such as when a significant percentage of cached translations are used only one time before being invalidated or ejected from the cache.

DETAILED DESCRIPTION

The following description is presented to enable any person skilled in the art to make and use the disclosed embodiments, and is provided in the context of one or more particular applications and their requirements. Various modifications to the disclosed embodiments will be readily apparent to those skilled in the art, and the general principles described herein may be applied to other embodiments and applications without departing from the scope of those that are disclosed. Thus, the present invention or inventions are not intended to be limited to the embodiments shown, but rather are to be accorded the widest scope consistent with the disclosure.

Address Translation Buffer

In some embodiments, an address translation buffer (ATB) is provided for facilitating address translations in accordance with the PCIe ATS (Address Translation Services) protocol, within a device operating as part of a PCIe (Peripheral Component Interface Express) fabric. In these embodiments, an ATB is a construct that does not require the dedicated hardware resources and the complexity associated with a traditional address translation cache (ATC), and may allow for equivalent or superior performance compared to an ATC, but with lower cost and less silicon area. The ATB may be implemented in firmware, in which case it does not require any dedicated hardware resources, or may be implemented in hardware without the resource footprint required by an ATC.

The ATB may illustratively be a ring buffer implementing a first-in first-out (FIFO) queue, although other forms or formats may be employed. For example, as one alternative an ATB may be implemented as a content associative memory or queue. This alternative implementation is particularly suitable for environments in which address translations are received out-of-order (with regard to the order of their respective translation requests) and are not reordered, because it allows entries (i.e., address translations) to be searched using untranslated addresses.

The nature of a device that employs an ATB is not limited, other than being of a type that requests conversion between untranslated addresses (UTAs) and translated addresses (TAs). For example, the device may function to move data between the device and a host computer system, between storage locations within the host system, between virtual machines executing on the host system, between a virtual machine and a hypervisor, between different processing threads, between a thread and another entity, etc. Therefore, in some illustrative implementations, the device may be or may include a data controller, network interface, storage (e.g., disk, SSD) controller, compression engine, graphics controller, cryptographic engine, etc.

Figure 1:
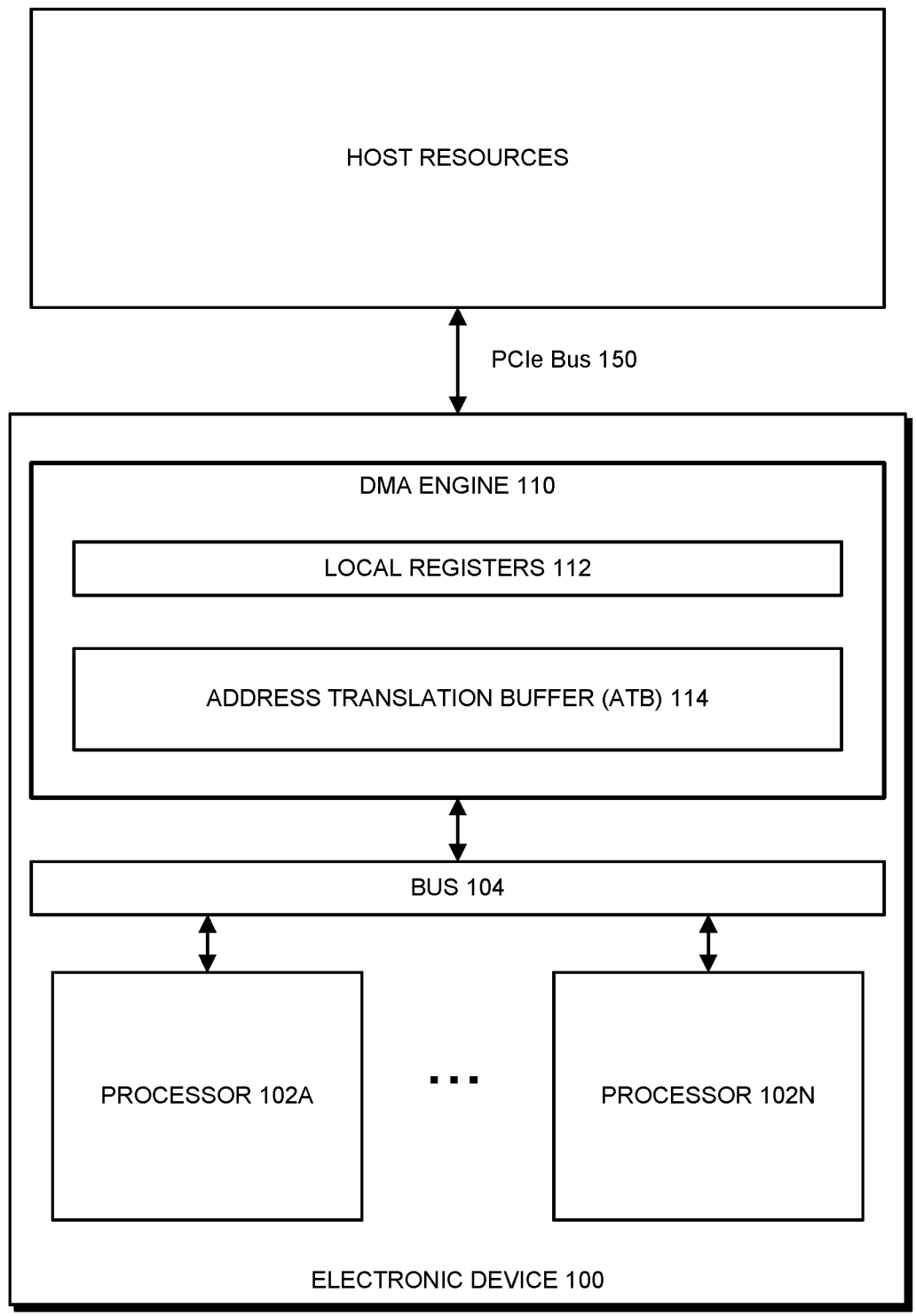
FIG. 1 is a block diagram of an electronic device that implements an address translation buffer, in accordance with some embodiments.

FIG. 1 is a block diagram of an electronic device that implements an address translation buffer according to one or more embodiments described herein.

In these embodiments, device 100 operates within or in conjunction with a host system that makes various resources accessible to the device via PCIe bus 150 and/or other paths. Host resources may include a central processing unit (CPU), an input/output memory management unit (IOMMU), primary and/or secondary storage, communication controllers (e.g., network, USB), graphics controllers, and so on.

Device 100 features one or more processors or microcontrollers 102 (e.g., processors 102A-102N), bus 104, and DMA (Direct Memory Access) engine 110. Other device components and interfaces are omitted in the interest of clarity. DMA engine 110 includes local registers 112 and address translation buffer (ATB) 114. The DMA engine operates according to instructions executed by one or more of processors 102.

During operation of device 100, a processor 102 instructs DMA engine 110 to translate a set of one or more untranslated (e.g., virtual) addresses, in order to enable a DMA operation (or for some other reason). In response, DMA engine 110 issues one or more corresponding translation requests to a host IOMMU via PCIe bus 150, receives one or more responses that include corresponding translated (e.g., physical) addresses and stores the response(s) in ATB 114. The address translation buffer may be configured to store different numbers of address translation responses in different implementations (e.g., 64, 128, 256). A buffered response may be identified by an identifier (e.g., a job ID), untranslated address, translated address, and/or other information.

In due course the processor receives or retrieves a buffered response and may use the response to initiate corresponding I/O (e.g., a memory read or memory write) or for some other purpose. Upon receipt of the response by the processor, from the ATB, the response may be temporarily stored in a processor cache or other temporary store for the processor (e.g., a static random-access memory or SRAM), before being used to initiate or perform an associated memory access.

In some embodiments, functions of DMA engine 110 may be divided between multiple separate components. For example, one component (e.g., a translation component)

may be responsible for issuing address translation requests, storing responses in the ATB, and delivering each response, in turn, to a processor and/or the second component. The second component (e.g., a DMA component) may be responsible for performing data transfers or copies using the responses. In these embodiments, ATB 114 may be considered to straddle both components.

Local registers 112 temporarily store signals and messages transmitted to or received from the host system via PCIe bus 150 to support emulation or implementation of ATS. Although shown separate from address translation buffer 114 in FIG. 1, in some embodiments local registers 112 may encompass ATB 114.

ATB 114 may straddle multiple clock domains. For example, processors 102 may operate within a first clock domain while some or all of DMA engine 110 (e.g., the interface(s) between the DMA engine and PCIe bus 150) operates within a second domain.

Note that, in some implementations or circumstances, a response to an address translation request may be immediately used or consumed in some manner instead of being buffered. For example, instead of storing a newly received response in the ATB, the response may first be delivered to a device processor 102. The processor may use the response (e.g., to initiate an I/O operation via DMA engine 110) without ever storing the response in the ATB, may relay the response to the ATB for storage after examination, or may temporarily store the response (e.g., in a processor cache or static RAM) prior to further processing.

In one or more embodiments, device 100 may include an address translation cache (ATC), which is not shown in FIG. 1, in addition to ATB 114. In these embodiments, address translation responses that are likely to be reused may be stored in the ATC, while responses that are unlikely to be reused may be stored in the ATB.

Figure 2:
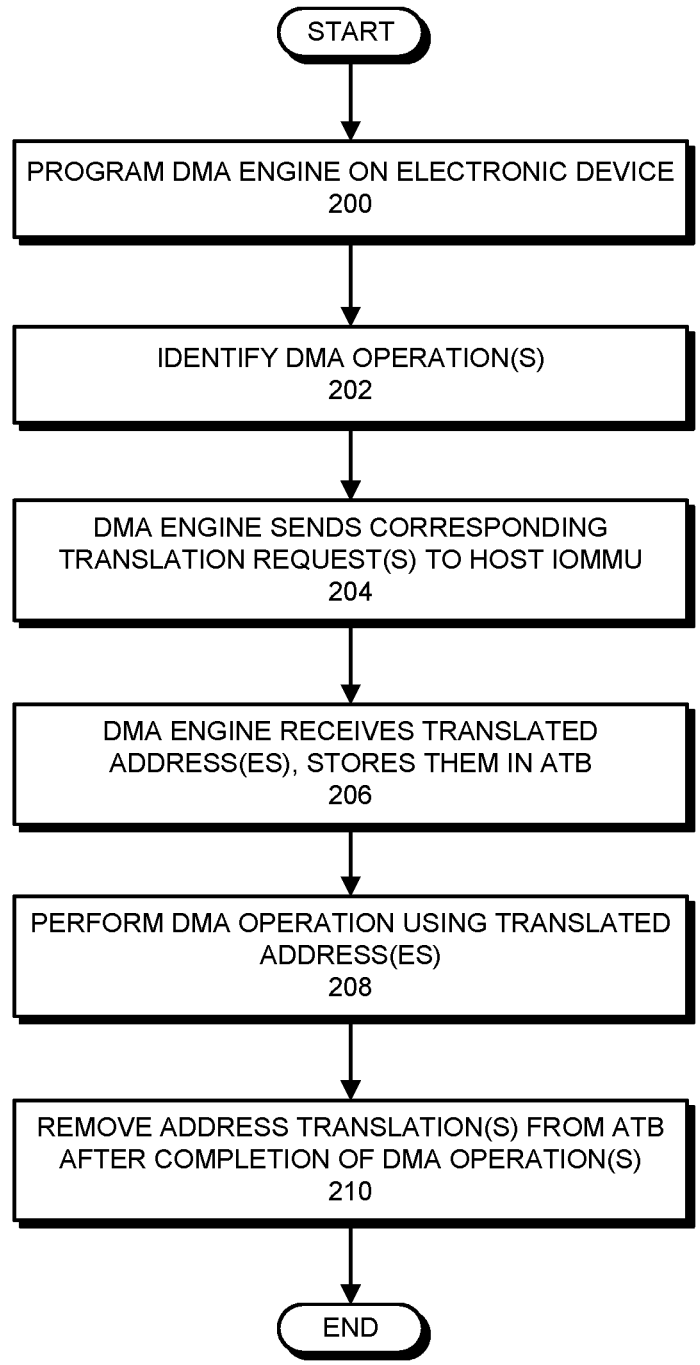
FIG. 2 is a flow chart illustrating a method of using an address translation buffer, in accordance with some embodiments.

FIG. 2 is a flowchart illustrating a process for using an address translation buffer according to one or more embodiments described herein.

The illustrated process commences with the programming of an electronic device's DMA engine by a host system processor and/or by a processor or controller residing on the device (step 200). The programming step may include loading a device driver, instantiating and/or configuring an address translation buffer, initializing local registers of the DMA engine, etc.

A desired DMA operation is then identified, possibly by a device processor (step 202), which includes an untranslated address. A single DMA operation may ultimately require multiple movements of data via the device's PCIe bus. In particular, a target DMA operation may involve transferring a greater amount of data than can be accommodated in a single bus transaction. Thus, although a device processor may see the transfer as a single operation, the DMA engine may have to perform several transactions using one translated address (which is suitably incremented as separate bus transactions are performed).

The DMA engine dutifully issues one or more corresponding translation requests (step 204) to a host system (e.g., a host IOMMU). It should be noted that a single DMA operation may require multiple address translations. For example, a multi-page data transfer may require separate translations for each page.

Subsequently, a response that includes a translated address associated with the untranslated address is received and stored in the ATB (step 206) for each translation request. Besides the translated address, a response may include associated metadata that is stored in the ATB with the translated address for the purpose of matching the translation response to the corresponding translation request, and/or for other purposes. Such metadata may illustratively include an identifier or tag, the untranslated address, a timestamp, and so on.

At a future time, a DMA operation corresponding to the response is performed utilizing one or more translated addresses read from the ATB (step 208). For example, the response may be forwarded to a processor that instructs the DMA engine to perform a memory read, a memory write, or some other operation using the translated address and/or other information in the response. After the DMA operation is completed, the corresponding address translation is purged from the ATB (step 210), and the illustrated method ends.

Figure 3A:
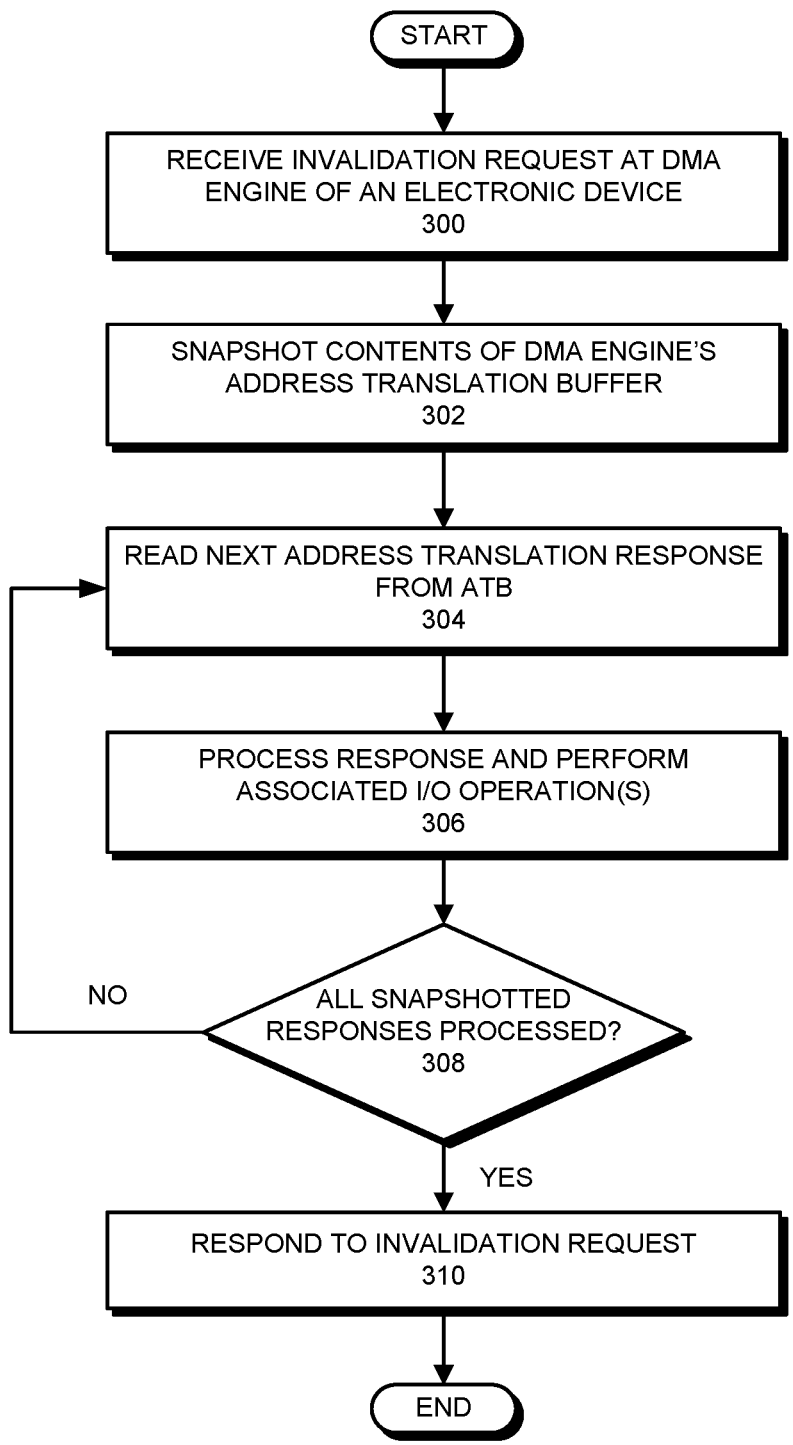
FIGS. 3A-B are flowcharts illustrating alternative processes for handling an invalidation request for an address translation buffer, within an electronic device, in accordance with some embodiments.
Figure 3B:
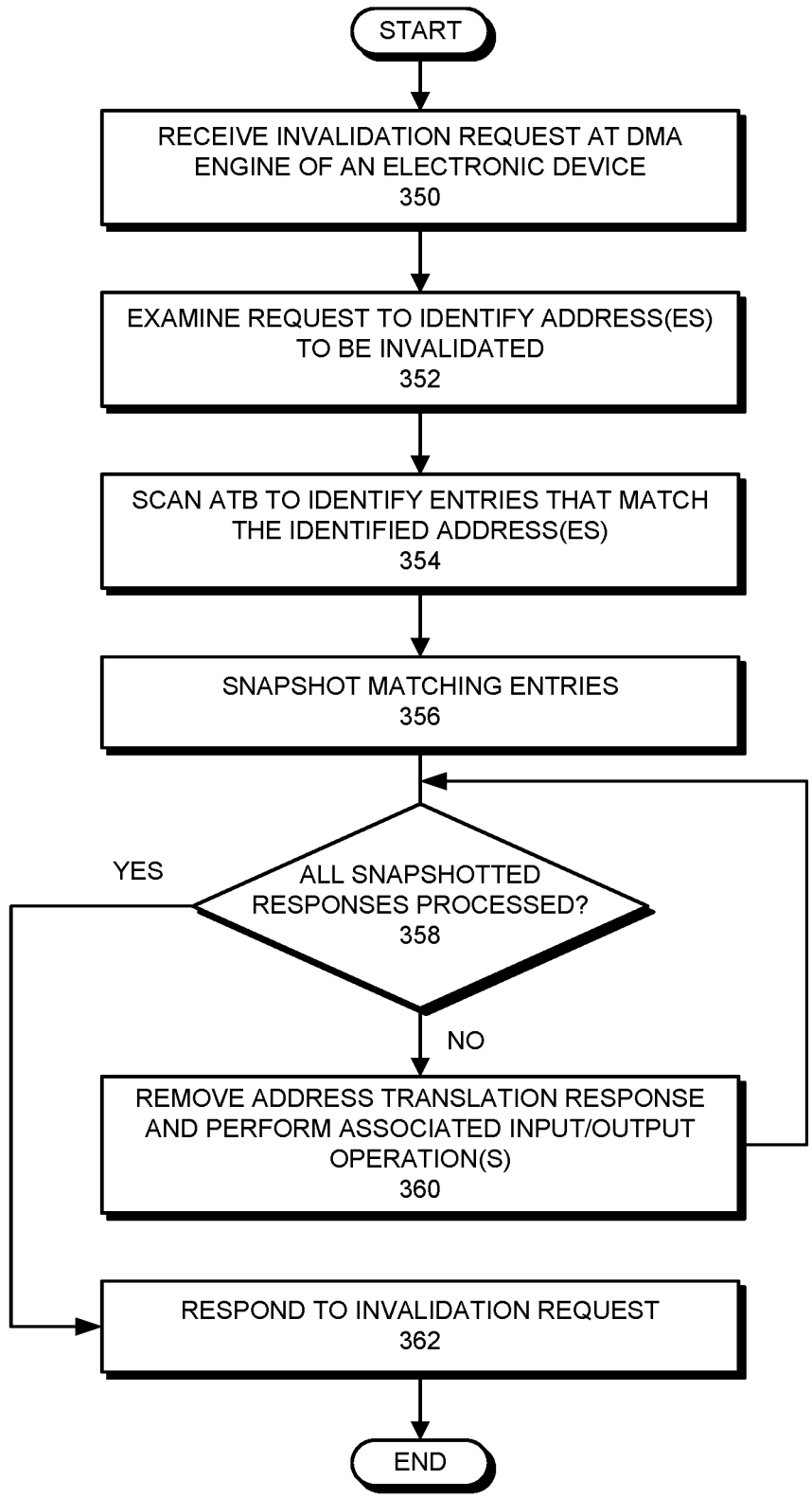

FIGS. 3A-B are flowcharts illustrating alternative processes for handling an invalidation request, within an electronic device that implements an address translation buffer, according to one or more embodiments described herein. The process shown in FIG. 3A generally requires less processing overhead in comparison to the process shown in FIG. 3B, but may take longer depending on the operating environment. For example, if no buffered translation requests match the invalidation request, the process shown in FIG. 3B may allow an earlier response to the invalidation request.

The process of FIG. 3A starts with receipt of an invalidation request at a DMA engine within an electronic device. The request specifies a memory address (or addresses) that are to be invalidated (step 300). In response, a snapshot is taken of the contents of the DMA engine's ATB (step 302). The snapshot memorializes all ATB entries/responses that were stored prior to the invalidation request.

Then, the device flushes the snapshotted buffer contents by removing the address translation response at the head of the buffer (step 304), processing the response to perform one or more memory accesses and/or other associated action(s) (step 306), and determining whether all snapshotted responses have been flushed from the ATB (step 308). Steps 304-308 may be repeated as necessary.

When all address translation responses that were buffered at the time of receipt of the invalidation request have been processed, and associated DMA operations involving the address translations have completed, the device responds to the invalidation request (step 310). Note that none, some, or all of the snapshotted responses may involve an address specified in the invalidation request. After step 310, the process of FIG. 3A is complete.

The process of FIG. 3B starts with receipt of an invalidation request at a DMA engine within an electronic device (step 350). The request is examined to identify the address (or addresses) that are to be invalidated (step 352).

In these embodiments, address translation responses stored in an ATB may include both the untranslated and translated addresses involved in the corresponding address translation requests that were dispatched to the host IOMMU (or other host component), and/or other data or metadata for matching an address translation response with the corresponding translation request.

After the target addresses are identified, the ATB is scanned (step 354) to identify all entries (address translation responses) that match the invalidation request. The identified entries (if any) are snapshotted (step 356).

Until all snapshotted entries are processed (step 358), the address translation response at the head of the ATB is removed and processed to perform a memory access and/or other associated action(s) (step 360), after which the process returns to step 358. When all snapshotted entries have been processed, the device responds to the invalidation request (step 362). Note that step 360 is never executed if no ATB entries match the invalidation request. In this case, no responses are snapshotted in step 356, which means that step 362 immediately follows step 356 or 358.

In some embodiments, at least one electronic device (e.g., electronic device 100) uses code and/or data stored on a non-transitory computer-readable storage medium to perform some or all of the operations described herein. More specifically, the at least one electronic device reads code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., eDRAM, RAM, SRAM, DRAM, DDR4 SDRAM, etc.), non-volatile RAM (e.g., phase change memory, ferroelectric random access memory, spin-transfer torque random access memory, magnetoresistive random access memory, etc.), read-only memory (ROM), and/or magnetic or optical storage mediums (e.g., disk drives, magnetic tape, CDs, DVDs, etc.).

In some embodiments, one or more hardware modules perform the operations described herein. For example, the hardware modules can include, but are not limited to, one or more central processing units (CPUs)/CPU cores, graphics processing units (GPUs)/GPU cores, application-specific integrated circuit (ASIC) chips, field-programmable gate arrays (FPGAs), compressors or encoders, compute units, embedded processors, accelerated processing units (APUs), controllers, and/or other functional blocks. When circuitry (e.g., integrated circuit elements, discrete circuit elements, etc.) in such hardware modules is activated, the circuitry performs some or all of the operations. In some embodiments, the hardware modules include general purpose circuitry such as execution pipelines, compute or processing units, etc. that, upon executing instructions (e.g., program code, firmware, etc.), performs the operations. In some embodiments, the hardware modules include purpose-specific or dedicated circuitry that performs the operations, possibly including circuitry that performs some or all of the operations "in hardware" and without executing instructions.

In some embodiments, a data structure representative of some or all of the functional blocks and circuit elements described herein (e.g., electronic device 100, processors 102, DMA engine 110) is stored on a non-transitory computer-readable storage medium that includes a database or other data structure which can be read by an electronic device and used, directly or indirectly, to fabricate hardware including the functional blocks and circuit elements. For example, the data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of transistors/circuit elements from a synthesis library that represent the functionality of the hardware including the above-described functional blocks and circuit elements. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described functional blocks and circuit elements. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N, M, and X. As used herein, despite possibly using similar letters in different locations in this description, the variables and unspecified values in each case are not necessarily the same, i.e., there may be different variable amounts and values intended for some or all of the general variables and unspecified values. In other words, particular instances of N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some embodiments.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope of the embodiments is defined by the appended claims, not the preceding disclosure.

What is claimed is:

1. An electronic device, comprising:
   an address translation cache;
   an address translation buffer, wherein the address translation cache and the address translation buffer are used for storing address translations received from a host computer system; and
   a direct-memory access (DMA) engine, the DMA engine configured to:
      issue a translation request to the host computer system regarding an untranslated address;
      receive an address translation comprising a translated address corresponding to the untranslated address; and
      store the address translation in the address translation buffer.

2. The electronic device of claim 1, wherein the DMA engine is further configured to:
   remove the address translation from the address translation buffer; and
   initiate a DMA operation using the translated address.

3. The electronic device of claim 1, wherein the DMA engine comprises:
   a translation component configured to issue the translation request and receive the address translation; and
   a DMA component configured to initiate the DMA operation.

4. The electronic device of claim 1, wherein the DMA engine comprises the address translation buffer.

5. The electronic device of claim 1, wherein:
the address translation buffer is implemented as a first-in first-out queue.

6. The electronic device of claim 1, wherein:
the address translation buffer is implemented as a content associative memory.

7. The electronic device of claim 1, wherein the address translation is purged from the address translation buffer upon use.

8. The electronic device of claim 1, wherein the DMA engine is further configured to:
receive from the host computer system an invalidation request;
snapshot address translations stored in the address translation buffer; and
flush the snapshotted address translations from the address translation buffer.

9. The electronic device of claim 1, wherein the DMA engine is further configured to:
receive from the host computer system an invalidation request, wherein the invalidation request identifies one or more target addresses;
identify address translations stored in the address translation buffer that match the one or more target addresses; and
flush address translations from the address translation buffer until all identified address translations have been removed from the address translation buffer.

10. The electronic device of claim 1, wherein the address translation cache includes dedicated cache operating circuitry that is not present in the address translation buffer.

11. The electronic device of claim 1, wherein operations for storing address translations in the address translation buffer and accessing the address translations in the address translation buffer are performed by firmware.

12. The electronic device of claim 1, wherein the address translations are to be used as addresses in communications on a peripheral component interface express (PCIe) fabric.

13. A method of buffering address translations within an electronic device that includes an address translation buffer and an address translation cache that are used for storing address translations received from a host computer system, the method comprising:
receiving an untranslated address;
dispatching to the host computer system a request to translate the untranslated address;
receiving from the host computer system an address translation comprising a translated address corresponding to the untranslated address; and
selectively storing the address translation in the address translation buffer or the address translation cache.

14. The method of claim 13, further comprising:
after storing the address translation in the address translation buffer:
removing the address translation from the address translation buffer;
delivering the address translation to a processor residing on the electronic device; and
initiating a direct memory access operation using the translated address.

15. The method of claim 13, wherein the address translation buffer is implemented as a first-in first-out queue.

16. The method of claim 13, further comprising:
receiving from the host computer system an invalidation request;
snapshotting address translations stored in the address translation buffer; and
flushing the snapshotted address translations from the address translation buffer.

17. The method of claim 13, further comprising:
receiving from the host computer system an invalidation request, wherein the invalidation request identifies one or more target addresses;
identifying address translations stored in the address translation buffer that match the one or more target addresses; and
flushing address translations from the address translation buffer until all identified address translations have been removed from the address translation buffer.

18. A non-transitory computer-readable medium storing instructions that, when executed by a processor, cause the processor to perform a method of buffering address translations within an electronic device, the method comprising:
receiving an untranslated address;
dispatching to a host computer system a request to translate the untranslated address;
receiving from the host computer system an address translation comprising a translated address corresponding to the untranslated address; and
storing the address translation in an address translation buffer, wherein the electronic device includes the address translation buffer and an address translation cache that are used for storing address translations received from the host computer system.

19. The non-transitory computer-readable medium of claim 18, wherein the method further comprises:
removing the address translation from the address translation buffer;
delivering the address translation to a processor residing on the electronic device; and
initiating a direct memory access operation using the translated address.

20. The non-transitory computer-readable medium of claim 18, wherein the address translation buffer is implemented as a first-in first-out queue.

21. The non-transitory computer-readable medium of claim 18, wherein the address translation is purged from the address translation buffer upon use.

22. The non-transitory computer-readable medium of claim 18, wherein the method further comprises:
receiving from the host computer system an invalidation request;
snapshotting address translations stored in the address translation buffer; and
flushing the snapshotted address translations from the address translation buffer.

23. The non-transitory computer-readable medium of claim 18, wherein the method further comprises:
receiving from the host computer system an invalidation request, wherein the invalidation request identifies one or more target addresses;
identifying address translations stored in the address translation buffer that match the one or more target addresses; and
flushing address translations from the address translation buffer until all identified address translations have been removed from the address translation buffer.

* * * * *